(12) United States Patent
Naeimi et al.

(10) Patent No.: US 12,212,600 B2
(45) Date of Patent: Jan. 28, 2025

(54) OFFLOAD OF DECRYPTION OPERATIONS

(71) Applicant: Intel Corporation, Santa Clara, CA (US)

(72) Inventors: Helia A. Naeimi, Santa Clara, CA (US); Sivakumar Munnangi, San Jose, CA (US); Namrata Limaye, Fremont, CA (US); Arvind Srinivasan, San Jose, CA (US); Gargi Saha, Santa Clara, CA (US); Hung Nguyen, San Jose, CA (US); Daniel Daly, Santa Barbara, CA (US)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 17/189,219

(22) Filed: Mar. 1, 2021

(65) Prior Publication Data

US 2021/0211467 A1  Jul. 8, 2021

Related U.S. Application Data

(63) Continuation-in-part of application No. 16/838,888, filed on Apr. 2, 2020.

(60) Provisional application No. 63/130,669, filed on Dec. 26, 2020, provisional application No. 62/834,936, filed on Apr. 16, 2019.

(51) Int. Cl.
*H04L 29/06* (2006.01)
*H04L 9/40* (2022.01)

(52) U.S. Cl.
CPC ........ *H04L 63/166* (2013.01); *H04L 63/0245* (2013.01); *H04L 63/0435* (2013.01); *H04L 63/20* (2013.01)

(58) Field of Classification Search
CPC .............. H04L 63/166; H04L 63/0245; H04L 63/0435; H04L 63/20; H04L 67/131; H04L 63/0272; H04L 69/166; H04L 63/0485

See application file for complete search history.

(56) References Cited

U.S. PATENT DOCUMENTS

| | | | |
|---|---|---|---|
| 7,409,558 B2 | 8/2008 | Beukema et al. | |
| 9,769,149 B1 * | 9/2017 | Brady | ................. H04L 63/0884 |
| 10,211,985 B1 | 2/2019 | Brandwine et al. | |
| 10,778,585 B1 | 9/2020 | Saalfeld et al. | |

(Continued)

OTHER PUBLICATIONS

Chelsio Communications, "Crypto Offload", https://web.archive.org/web/20180418210314/https://www.chelsio.com/crypto-offload/, Apr. 18, 2018, 2 pages.

(Continued)

*Primary Examiner* — Mahfuzur Rahman
(74) *Attorney, Agent, or Firm* — Compass IP Law PC

(57) ABSTRACT

Examples described herein relate to a Transport Layer Security (TLS) offload engine to: based on detection of encrypted data unassociated with a previously detected data header: search for one or more data headers; identify at least two candidate data headers for validation; and based on receipt of an indication that the at least two candidate data headers are valid, perform decryption of received data in one or more packets. In some examples, the TLS offload engine is to: based on receipt of an indication that one or more of the at least two candidate data headers is not a valid header, search for two or more other candidate data headers.

17 Claims, 12 Drawing Sheets

(56) References Cited

U.S. PATENT DOCUMENTS

| | | | |
|---|---|---|---|
| 11,062,302 B1 | 7/2021 | Ho et al. | |
| 2004/0230797 A1* | 11/2004 | Ofek | H04L 63/12 713/168 |
| 2007/0130352 A1 | 6/2007 | Chhabra et al. | |
| 2007/0162744 A1* | 7/2007 | Hoshino | H04L 61/4535 713/156 |
| 2008/0184331 A1* | 7/2008 | Cam-Winget | H04L 63/123 726/1 |
| 2009/0006839 A1* | 1/2009 | Matsuoka | H04L 9/083 713/150 |
| 2009/0249059 A1 | 10/2009 | Asano | |
| 2010/0165897 A1* | 7/2010 | Sood | G06F 1/3293 370/311 |
| 2010/0223457 A1* | 9/2010 | Durham | H04L 9/0827 380/279 |
| 2013/0097615 A1* | 4/2013 | Falco | G06F 9/546 719/313 |
| 2016/0094581 A1* | 3/2016 | Kasbekar | H04L 63/0281 713/151 |
| 2016/0234123 A1 | 8/2016 | Alisawi et al. | |
| 2016/0330112 A1 | 11/2016 | Raindel et al. | |
| 2018/0152467 A1 | 5/2018 | Anderson et al. | |
| 2018/0167207 A1* | 6/2018 | Chaubey | H04L 9/0841 |
| 2018/0278583 A1* | 9/2018 | Cela | H04L 69/12 |
| 2019/0116127 A1 | 4/2019 | Pismenny et al. | |
| 2019/0132296 A1 | 5/2019 | Jiang et al. | |
| 2019/0229903 A1 | 7/2019 | Balasubramanian et al. | |
| 2020/0236140 A1 | 7/2020 | Srinivasan et al. | |
| 2021/0160009 A1 | 5/2021 | Goyal et al. | |
| 2021/0211467 A1 | 7/2021 | Naeimi et al. | |
| 2021/0281608 A1 | 9/2021 | Green et al. | |
| 2022/0329558 A1* | 10/2022 | Khan | H04L 51/234 |

OTHER PUBLICATIONS

Netdev, "TLS Offload to Network Devices", Netdev 1.2, https://web.archive.org/web/20171202211713/https://netdevconf.org/1.2/session.html?boris-pismenny, Dec. 2, 2017, 4 pages.
Netdev, "TLS Receive Side Crypto Offload", Netdev 2.2—Session, https://web.archive.org/web/20180131144710/https://www.netdevconf.org/2.2/session.html?pismenny-tlscrypto-talk, Jan. 31, 2018, 3 pages.
Netronome, "Agilio® CX 50GbE SmartNIC for OCP With Inline Crypto and Buffer Management", Product Brief, Netronome Systems, Inc., Mar. 2019, 2 pages.
Pismenny, Boris, "TLS Crypto Offload to Network Devices", Mellanox Technologies, Netdev conference, Tokyo, Oct. 2016, 22 pages.
Pismenny, Boris, et. al., "TLS Offload to Network Devices—Rx Offload", Mellanox, Dec. 3, 2017, 5 pages.
Stewart, Randall, et. al., "Optimizing TLS for High-Bandwidth Applications in FreeBSD", Netflix Inc., Feb. 13, 2015, 6 pages.
Watson, Dave, "Crypto kernel TLS socket", https://lwn.net/Articles/665602/, Nov. 23, 2015, 2 pages.
Watson, Dave, "KTLS: Linux Kernel Transport Layer Security", Facebook, San Francisco, USA, Sep. 26, 2016, 4 pages.
International Search Report and Written Opinion for PCT Patent Application No. PCT/US21/52078, Mailed Jan. 19, 2022, 11 pages.
Nowlan, Michael, "Unordered Delivery in TLS-Encrypted TCP Connections", 690 Report, Department of Computer Science, Yale University, Published 2011, 7 pages.
Final Office Action for U.S. Appl. No. 16/838,888, Mailed Feb. 7, 2023, 31 pages.
"Kernel Transport Layer Security (kTLS) Offloads", Nvidia, https://docs.nvidia.com/networking/m/view-rendered-page.action?abstractPageId=37849165, downloaded from the internet Nov. 2, 2022, 2 pages.
Baldwin, John, "TLS Offload in the Kernel", FreeBSD Journal, May/Jun. 2020, 12 pages.
Mellanox, Chelsio and Netflix, "Kernel TLS and hardware TLS offload in FreeBSD 13", Mellanox Technologies, Sep. 29, 2019, 30 pages.
Nowlan, Michael F., "Unordered Delivery in TLS-Encrypted TCP Connections", Department of Computer Science, Yale University, Downloaded from the internet Nov. 2, 2022, 7 pages.
First Office Action for U.S. Appl. No. 16/838,888, Mailed Jun. 7, 2022, 23 pages.

* cited by examiner

OFFLOAD OF DECRYPTION OPERATIONS

RELATED APPLICATIONS

The present application claims the benefit of a priority date of U.S. provisional patent application Ser. No. 63/130,669, filed Dec. 26, 2020, the entire disclosure of which is incorporated herein by reference.

This application is a continuation-in-part of U.S. patent application Ser. No. 16/838,888, filed Apr. 2, 2020, which claims the benefit of a priority date of U.S. provisional patent application Ser. No. 62/834,936, filed Apr. 16, 2019.

DESCRIPTION

Various cryptographic protocols provide security of communications made over a computer network. Secure Sockets Layer (SSL) and Transport Layer Security (TLS) are examples of security protocols. TLS provides end-to-end encryption at the application layer and TLS can secure application-to-application communication. For example, cloud service providers (e.g., social media and online payment platforms) use TLS to provide secure communications. TLS is a widely deployed protocol used for securing transmission control protocol (TCP) connections on the Internet. TLS is also a feature for HTTP/2, an Internet protocol.

TLS is defined at least in The Transport Layer Security (TLS) Protocol Version 1.3, RFC 8446 (August 2018). Data encrypted using TLS is of an arbitrary size and passes from one end of a socket to another end of the socket. A TLS segment can run across a fraction of a TCP packet or across hundreds (or more) of TCP packets. TLS can involve encrypting up to, e.g., 16 KB of data at a time using a cryptographic key agreed upon by two sides of the connection. Periodically, the two sides of the connection can agree to update the key, such as for long-lived connections (e.g., an audio or video stream). Kernel TLS (kTLS) is a Linux kernel implementation of a TLS data path whereby encryption and decryption steps are moved into the kernel and inline with the flow of traffic into and out of a computer or server.

TLS data-path offload allows the network interface controller (NIC) to accelerate encryption, decryption and authentication in accordance with Advanced Encryption Standard with Galois/Counter Mode (AES-GCM). Performing encryption and decryption into the network interface can free up cores and memory bandwidth for other uses by applications and customer workloads. CPU-based cryptography offloads involve copying data out of memory, into an encryption/decryption engine, and copying encrypted/decrypted data back into memory. In some cases, many copy operations can take place where encryption or decryption operations are performed on individual relatively small-sized records (e.g., 16 KB) and records are encrypted or decrypted one record at a time. In other words, while an offload engine can save CPU cycles as compared to performing the same operation using CPU instructions, CPU resources (e.g., CPU cycles, cache space, and memory space) are utilized to migrate data for use by the encryption/decryption engine and after use by the encryption/decryption engine.

Decryption requires packets to arrive in order to be able to decrypt TLS segments but when TCP packets arrive out of order at the NIC, the TLS accelerator has to be able to perform decryption of packet contents received out of order. In some solutions, when an out of order (OOO) packet is detected by a decryption accelerator, the accelerator waits for the maximum TLS segment size and then starts to look for the TLS header (e.g., 5 byte character). If there is a potential match, the decryption accelerator sends a pointer to the host system, and waits for the confirmation from the application or driver to start decrypting records. After the first OOO packet, the decryption can be performed by a software stack running on a CPU. However such solution may fail to achieve header identification due to latency between the time the accelerator sends the request to the time the confirmation is received form the host, resulting in no further cryptography acceleration in the accelerator.

DETAILED DESCRIPTION

In some embodiments, based on detection of a first OOO packet at a TLS cryptography engine in a NIC, the cryptography engine can perform a TLS header search or hunt mode to identify at least one previously undetected TLS header. In some examples, hardware resources that were to be used for the decryption can be used to perform a TLS header string matching to find a new TLS header. A protocol software running on a CPU or XPU may not be informed of speculative TLS frame detection or TLS header hunting until the cryptography engine has high confidence that a previously unidentified TLS header is identified by the cryptography engine. The confidence threshold is a programmable parameter in the cryptography engine and can be a number of candidate record headers. In response to the protocol software providing a confirmation that the candidate record headers are valid to the cryptography engine, the cryptography engine and protocol software can be synchronized as to received beginning of TLS frames and the cryptography engine can resume decryption of TLS frames.

While examples are described with respect to TLS, any cryptography technique can be used such as any transport layer security or any cryptography scheme such as SSL, blockchain, Mozilla Network Security Services (NSS), DNS-based Authentication of Named Entities (DANE) (RFC 6698), and so forth.

Figure 1:
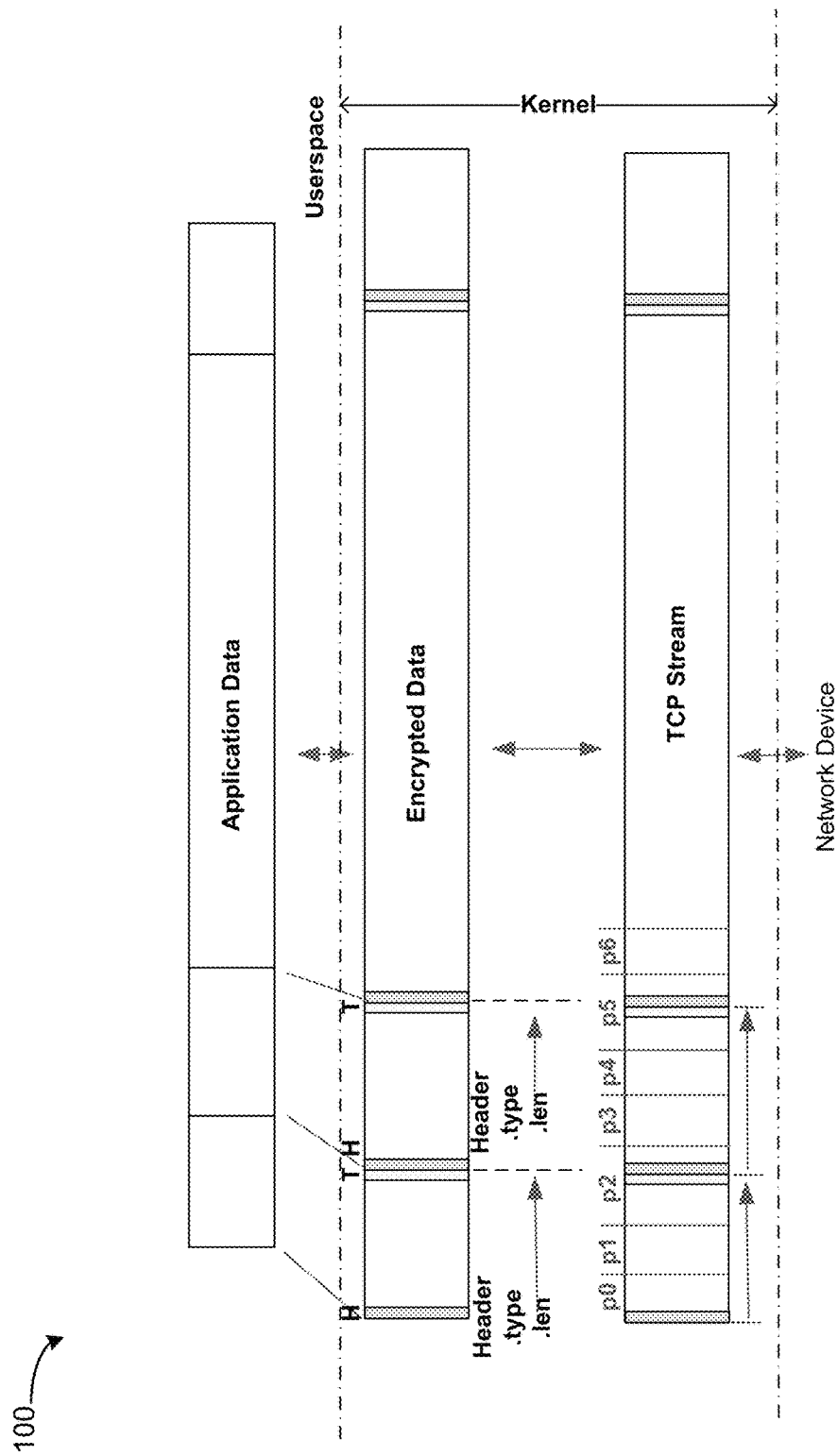
FIG. 1 shows a flow of information from application data to the network.

FIG. 1 shows a flow of information from the application data to the network. In this example 100, an application in user space can originate application data for transmission or process received data. In a kernel, a TLS layer can segment application data into records and encrypt the records. Records can be encrypted using AES-GCM. A record header can include fields of a header.type and header.len (record length) as well as application data. A record can end with a trailer, where a trailer can include TLS authentication fields. Based on applicable maximum segment size (MSS), an encrypted record can be provided for transmission using one or more packets as part of a stream of transmission control protocol (TCP) compatible packets. In this example, a record is transmitted over packets p0, p1, and p2 and another record is transmitted over packets p2, p3, p4, and p5. Note that packet p2 includes portions of two records. While examples are provided with respect to TCP as the transport layer, any transport layer protocol can be used.

Figure 2A:
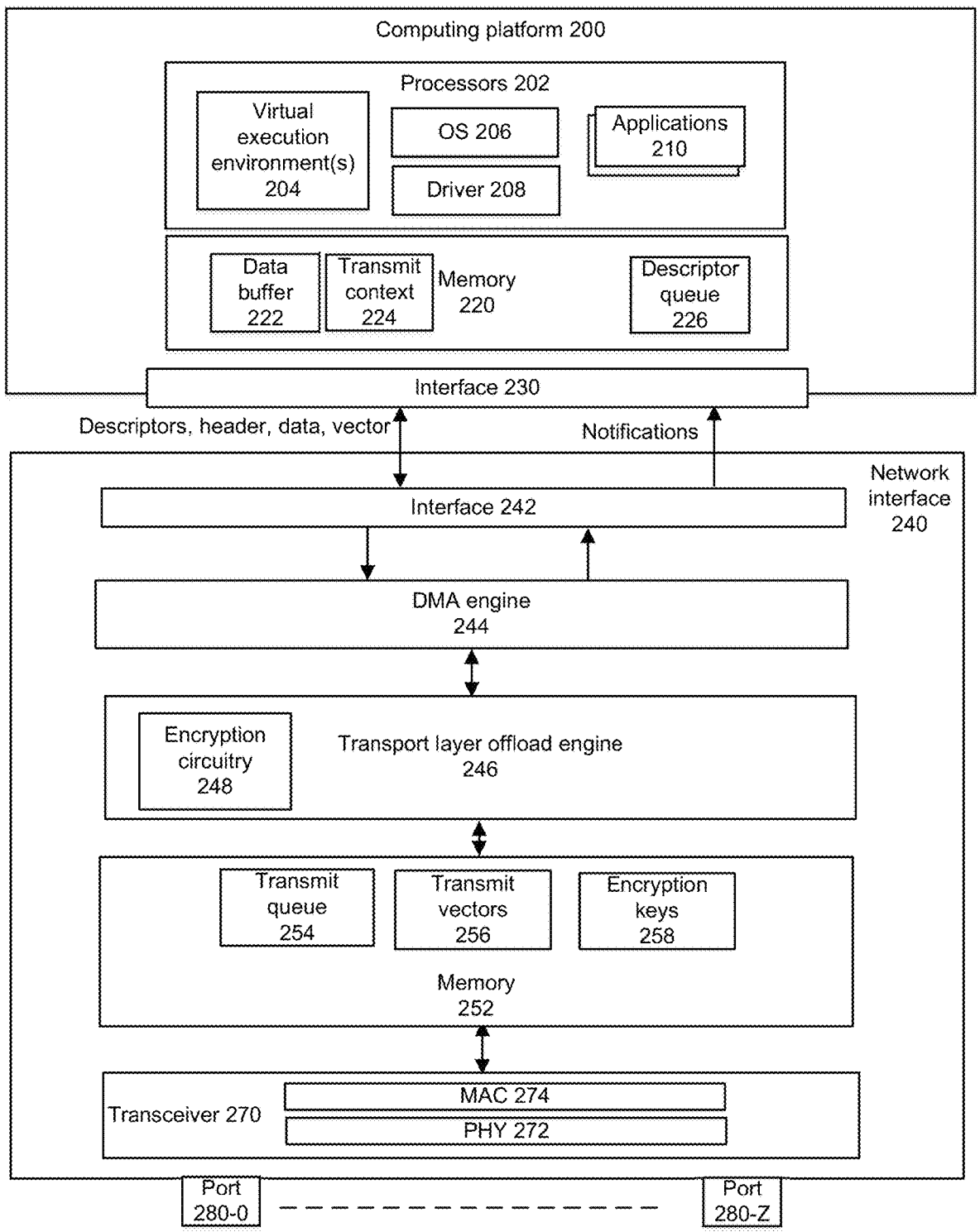
FIG. 2A depicts an example system.

FIG. 2A depicts an example system. In this system, computing platform 200 can provide data for transmission and offload encryption of data to network interface 240 and also control which specific packets, that contain segments of data, are transmitted (or re-transmitted) by network interface 240. For example, data can be encrypted using TLS or other encryption scheme. For example, TLS version 1.2 is described at least in RFC 5246 (2008) and TLS version 1.3 is described at least in RFC 8446 (2018), but any versions of TLS can be supported. Network interface 240 can perform encryption on data or a record from platform 200 and segment encrypted data for transmission using one or more packets. In the event of packet loss or non-receipt at a receiver, network interface 240 can issue a NACK (or duplicate ACK) and cause re-transmission of the non-received packet. Application 210 can track record boundary per packet (e.g., packets 0-3 transmit record0; packets 3-4 transmit record1; and so forth) using transmit context 224 and determine which packet(s) to re-transmit.

Computing platform 200 can include at least various processors 202 and memory 220. Processors 202 can execute virtual execution environment 204, operating system 206, network interface driver (or device driver) 208, and applications 210. Processors 202 can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Processors 202 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein.

A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from one other, allowing virtual machines to run Linux® and Windows® Server operating systems on the same underlying physical host. Examples of a hypervisor include Kernel-based Virtual Machine (KVM), VMware Workstation Pro, Xen Server, VMware vSphere, VMware ESXi, VMware Player, VMware Workstation, Microsoft Hyper-V, QEMU, VirtualBox, or Kubernetes.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container may run the same in different environments. For example, a container that includes PHP and MySQL can run identically on both a Linux computer and a Windows® machine. Second, containers provide added security since the software may not affect the host operating system. While an installed application may alter system settings and modify resources, such as the Windows® registry, a container can only modify settings within the container.

In some examples, operating system 206 can be any of Linux®, Windows® Server, FreeBSD, Android®, MacOS®, iOS®, Cisco IOS, Juniper Junos, or any other operating system. Operating system 206 and applications 210 can run within a virtual execution environment 204 or outside of virtual execution environment 204. Driver 208 can provide an interface between virtual execution environment 204 or operating system (OS) 206 and network interface 240. In some examples, OS 206 queries device driver 208 for capabilities of network interface 240 and learns of a capability by network interface 240 to encrypt data for transmission and an application can control which packet to transmit or re-transmit. In other examples, OS 206 can instruct network interface 240 to encrypt data for transmission and an application can control which packet to transmit or re-transmit.

Applications 210 can be any type of application including media streaming application (e.g., video or audio), virtual reality application (including headset and sound emitters), augmented reality application, video or audio conference application, video game application, or database. In some examples, applications 210 run within a virtual execution environment 204 or outside of virtual execution environment 204.

Computing platform 200 can open a socket to send packet traffic to a receiver. For example, computing platform 200 (using network interface 240) and the receiver can perform a TLS handshake to exchange information and establish a connection. If the connection is established, computing platform 200 (or other entity) sends cipher information (e.g., encryption key) for this socket (e.g., security association (SA)) to network interface 240 for use by encryption circuitry 248. Platform 200 can write cipher information into encryption keys 258 to map a socket's 5-tuple (e.g., layer 2 destination, source, layer 4 destination port, layer 4 source port, protocol) to the cipher information given by the sender.

OS 206 can negotiate with network interface 240 via driver 208 to detect that offload TCP segmentation, data encryption, and control over particular packet transmission (or re-transmission) is available for data (e.g., TLS record-level). For example, application 210 can cause copying of application data from data buffer 222 to transmit queue 254 of network interface 240 to be encrypted using TLS (e.g., up to 16 KB of data, header and trailer). In some examples, OS 206 pre-segments data along TLS record boundaries instead of transport layer maximum segment size (MSS). For data to be transmitted, OS 206 can provide a vector that indicates whether to transmit one or more packet that is to carry a segment of data and the vector can be stored in transmit vectors 256 in memory 252.

Interface 230 and interface 242 can provide communicative coupling between platform 200 and network interface 240. For example, communicative coupling can be based on Peripheral Component Interconnect express (PCIe), or any public or proprietary standard. Direct memory access (DMA) engine 244 can transfer data and corresponding packet descriptor to memory 252. For example, a portion of the packet can be copied via DMA to a packet buffer in memory 252.

Direct memory access (DMA) is a technology that allows an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations. Without DMA, when the CPU or core is using programmed input/output, the CPU or core is typically occupied for the entire duration of a read or write operation and is unavailable to perform other work. With DMA, the CPU or core can, for example, initiate a data transfer, and then perform other operations while the data transfer is in progress. The CPU or core can receive an interrupt from a DMA controller when the data transfer is finished.

Transport layer offload engine 246 can inspect packet data in transmit queue 254 and determines if a packet's header (e.g., n-tuple) identifies the packet as a TLS record and a security association (SA) is found for this n-tuple. For example, an n-tuple can include one or more of: a source IP address, source port number, destination IP address, destination port number and the protocol in use. For example, a transmit queue 254 can include packet related information for packet transmission including one or more of: layer 2 (L2) header, layer 3 (L3) header, TCP header, TLS Record Header, TLS Application Data, and TLS Record Trailer. Transport layer offload engine 246 can cause encryption circuitry 248 to perform encryption on the data including packet payload, the packet header, and/or the packet header and payload.

After encryption, data is scheduled for transmission out of the uplink a maximum segment size (MSS)-worth of data at a time. For example, an MSS-worth of data that is part of a larger TCP datagram (for example, a TLS record) is segmented and available for transmission. Segmentation can include copying the L2, L3, L4 headers and prepending the headers to the segment of data, and adjusting the checksums and lengths to build a valid header. In some examples, transport layer offload engine 246 performs TCP segmentation offload or large send offload (LSO) for UDP packets. Note that transport layer offload engine 246 can support any protocol such as TCP (e.g., RFC 793), User Datagram Protocol (UDP) (e.g., RFC 768), quick UDP Internet Connections (QUIC) (e.g., QUIC: A UDP-Based Multiplexed and Secure Transport draft-ietf-quic-transport-22 (July 2019)). If the packet is a TLS record without a security association, the packet can be transmitted with no encryption, flagged as a warning, or dropped, depending on an applicable configuration.

A packet can refer to various formatted collections of bits that may be sent across a network, such as Ethernet frames, IP packets, TCP segments, UDP datagrams, QUIC segment, RTP segments, and so forth. References to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

A packet can be associated with a flow. A flow can be one or more packets transmitted between two endpoints. A flow can be identified by a set of defined tuples, such as two tuples that identify the endpoints (e.g., source and destination addresses). For some services, flows can be identified at a finer granularity by using five or more tuples (e.g., source address, destination address, IP protocol, transport layer source port, and destination port).

If a packet was successfully received, an ACK can be sent by the receiver to network interface 240. OS 206 can maintain TSO data until packets associated with TSO are acknowledged by a receiver as received. In connection with packet drops or lost packets at a receiver indicated by NACK or duplicate ACK, OS 206 can use a transport layer stack determine whether a packet is to be re-transmitted. In a re-transmit scenario, OS 206 can copy out a section of the saved data, create a new TCP header from that data and cause a packet with the section to be resent to the receiver.

In some examples, a sequence number of a packet to be re-transmitted is identified using NACK or duplicate ACK. OS 206 can request application 210 to identify one or more record corresponding to the packet to be re-transmitted. A transmit context 224 can be used to associate byte ranges of a data with a packet identifier (e.g., sequence number) that is to transmit the byte range of data. Using transmit context 224, application 210 determines which record is the subject of the packet re-transmission and provides an entire record that includes one or more segment to re-transmit in a packet.

In this example, network interface 240 does not save state of one or more transmitted packet but uses bandwidth of interfaces 230 and 242, which may not bandwidth constrained, to access a record for packet re-transmission. If a Peripheral Component Interconnect express (PCIe) interface is used, a record can traverse a PCIe interface to be re-encrypted and uses additional bandwidth of the PCIe interface. This leads to some interface bandwidth use, but a PCIe interface may not be a bottleneck, even during peak network events.

Transceiver 270 can be capable of receiving and transmitting packets in conformance with the applicable protocols such as Ethernet as described in IEEE 802.3, although other protocols may be used. Transceiver 270 can receive and transmit packets from and to a network via a network medium (not depicted). Transceiver 270 can include PHY circuitry 272 and media access control (MAC) circuitry 274. PHY circuitry 272 can include encoding and decoding circuitry (not shown) to encode and decode data packets. MAC circuitry 274 can be configured to assemble data to be transmitted into packets, that include destination and source addresses along with network control information and error detection hash values. Network interface 240 includes one or more ports 280-0 to 280-Z. A port can represent a physical port or virtual port. A packet can be transmitted or received using ports 280-0 to 280-Z.

Figure 2B:
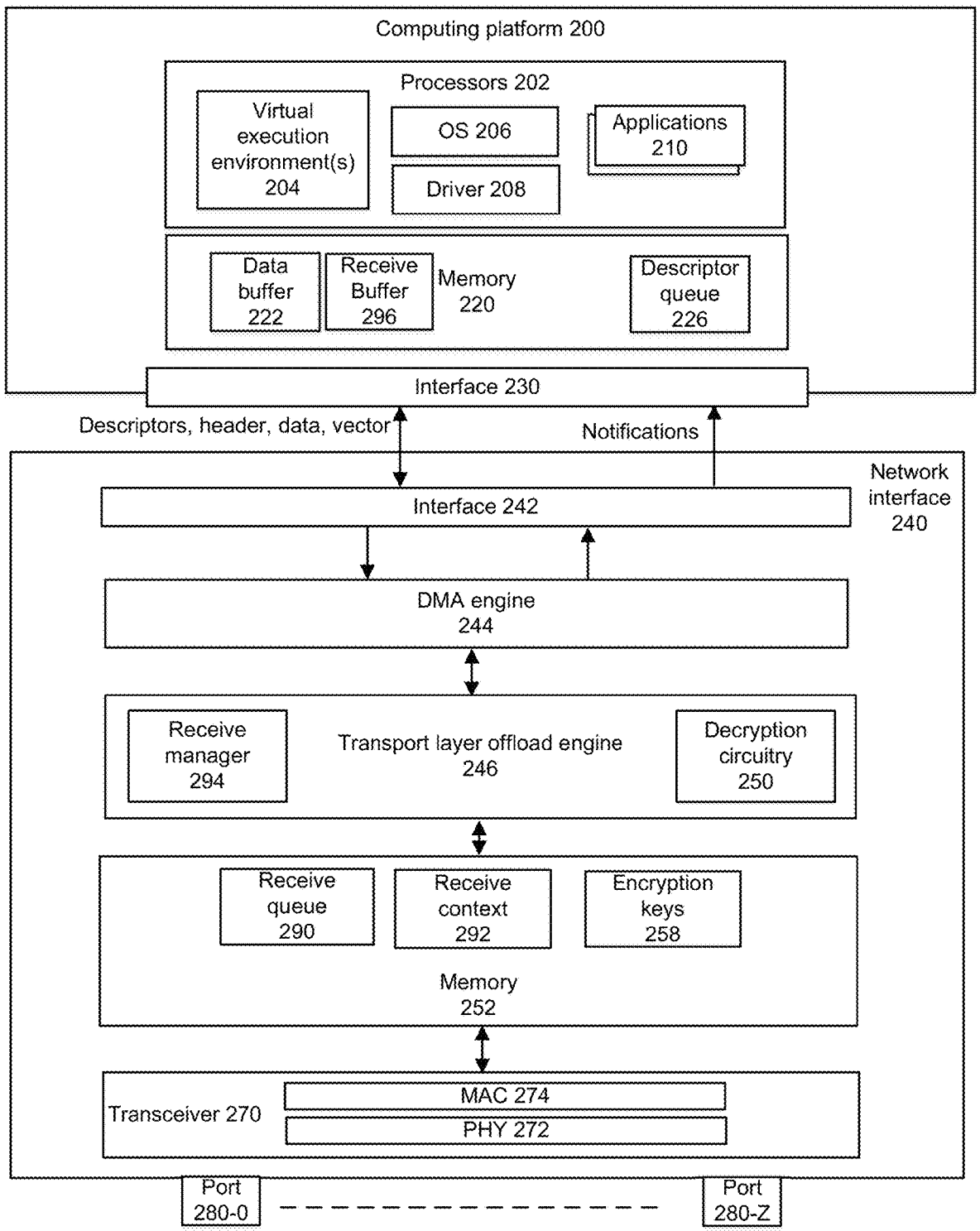
FIG. 2B depicts an example system.

FIG. 2B depicts an example of a receiver system. The receiver system can use similar elements of transmitter system of FIG. 2A and for the sake of illustration, receiver-side elements are described, but elements of transmitter and receiver systems can be combined. Data from received packets can be stored in receive queue 290. Receive manager 294 can use receive context 292 to store a receive context that identifies which segment(s) of a data are received and the received segment(s). Receive manager 294 can determine if segments of data are received based on identifying a head of data and its specified length in a received packet and identified in receive context 292. Memory 252 can be on or off-chip from network interface 240. Where memory 252 is off-chip from network interface 240, memory 252 can be communicatively coupled using an interface such as any type of double data rate (DDR) memory interface. In some embodiments, after segments of data are received, the data is decrypted using decryption circuitry 250 and provided to data buffer 222 of platform 200 for access by an application.

In some embodiments, transport layer offload engine 246 can use receive manager 294 to identify received and missing packets and generate ACKs or NACKs or duplicate ACKs to a sender for missing packets and for successfully received packets. For example, if a segment is not received within a timer window of another packet that conveys a segment of the same data, receiver manager 294 can generate and cause transmission of a NACK or duplicate ACK to the receiver to request re-transmission of one or more packets. A NACK or duplicate ACK can identify a missing sequence number.

In accordance with some embodiments, described herein, decryption circuitry 250 can perform TLS data-path offload of decryption and authentication in accordance with AES-GCM. For example, if a header of a TLS record is detected, then decryption circuitry 250 can perform decryption of TLS records received in one or more packets. For example, in cases where a TLS record is received for which a TLS header was not previously identified, processors 202 of computing platform 200 can perform TLS record decryption and decryption circuitry 250 can search for an integer M candidate TLS headers. Decryption circuitry 250 can attempt to identify M candidate TLS headers by searching for a character string that identifies a TLS header and use a record length field associated with the identified TLS header to determine an end of the record and beginning of a next record (e.g., next record header). Decryption circuitry 250 can determine if a character string that identifies a TLS header is present in the next record header. Based on detection of M candidate TLS headers based on record length fields, decryption circuitry 250 can provide the M candidate TLS headers to one or more of: OS 206, driver 208, or applications 210. OS 206, driver 208, or applications 210 can indicate whether the M candidate TLS headers are valid or if there is an invalid header among the M candidate TLS headers to decryption circuitry 250. If M candidate TLS headers are indicated to be valid headers, decryption circuitry 250 can continue to decrypt TLS records. While examples refer to TLS records, any type of data can be decrypted using any decryption standard or specification.

Note that while reference to network interface 240 is made, any type of accelerator, or hardware device can be used in place of network interface such as a storage controller (e.g., Non-volatile memory express (NVMe) storage controller), Infrastructure Processing Unit (IPU) or data processing unit (DPU), or smartNIC.

In some examples, either or both of network interface 240 of FIG. 2A or 2B could include a ternary content-addressable memory (TCAM) or content-addressable memory that stores packet processing rules or match-action rules to be applied by a programmable packet processing pipeline of a data plane. A TCAM can search its entire contents in a single clock cycle. For example, packet processing rules or match-action rules can include one or more of: access control lists (ACLs), forwarding rules, quality of service (QoS), or other metadata.

Figure 3A:
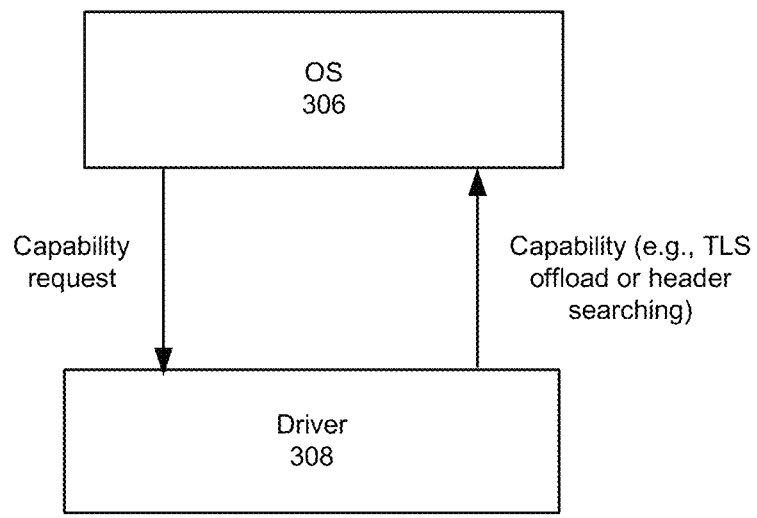
FIG. 3A depicts an example interaction between an operating system and device driver.

FIG. 3A depicts an example interaction between an operating system and device driver. For example, operating system 306 can determine a capability of a device associated with device driver 308. For example, operating system 306 can receive an indication of capability of a device (e.g., network interface) to perform one or more of: data encryption (e.g., TLS or kTLS), data segmentation, packet formation from data segmentation, selective re-transmission of packets with encrypted data, buffering of received packets with encrypted data, reassembly of received data, decryption of received data (e.g., TLS or kTLS), candidate record header searching, packet receipt acknowledgement or packet re-transmit request, or any operation offloaded to a network interface.

Figure 3B:
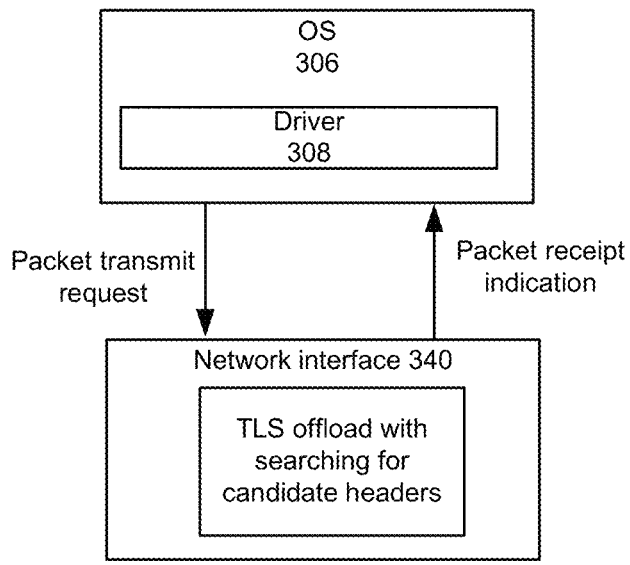
FIG. 3B depicts an example interaction between an operating system and network interface.

FIG. 3B depicts an example interaction between an operating system and network interface. For example, operating system 306 can provide requests to network interface 340 to cause packet transmission and utilize one or more features of network interface 340: data encryption (e.g., TLS or kTLS), data segmentation, packet formation from data segmentation, selective re-transmission of packets with encrypted data, candidate header searching, or transport layer segmentation. Network interface 340 can provide operating system 306 an indication of packet receipt. In some examples, indication of packet receipt can include or also include: a received packet header, dummy packet data, decrypted data from data decryption performed by network interface 340, TLS or kTLS data decryption, a decrypted record, a re-transmitted data segment or decrypted data segment, identification of one or more candidate record headers, and others.

Figure 4:
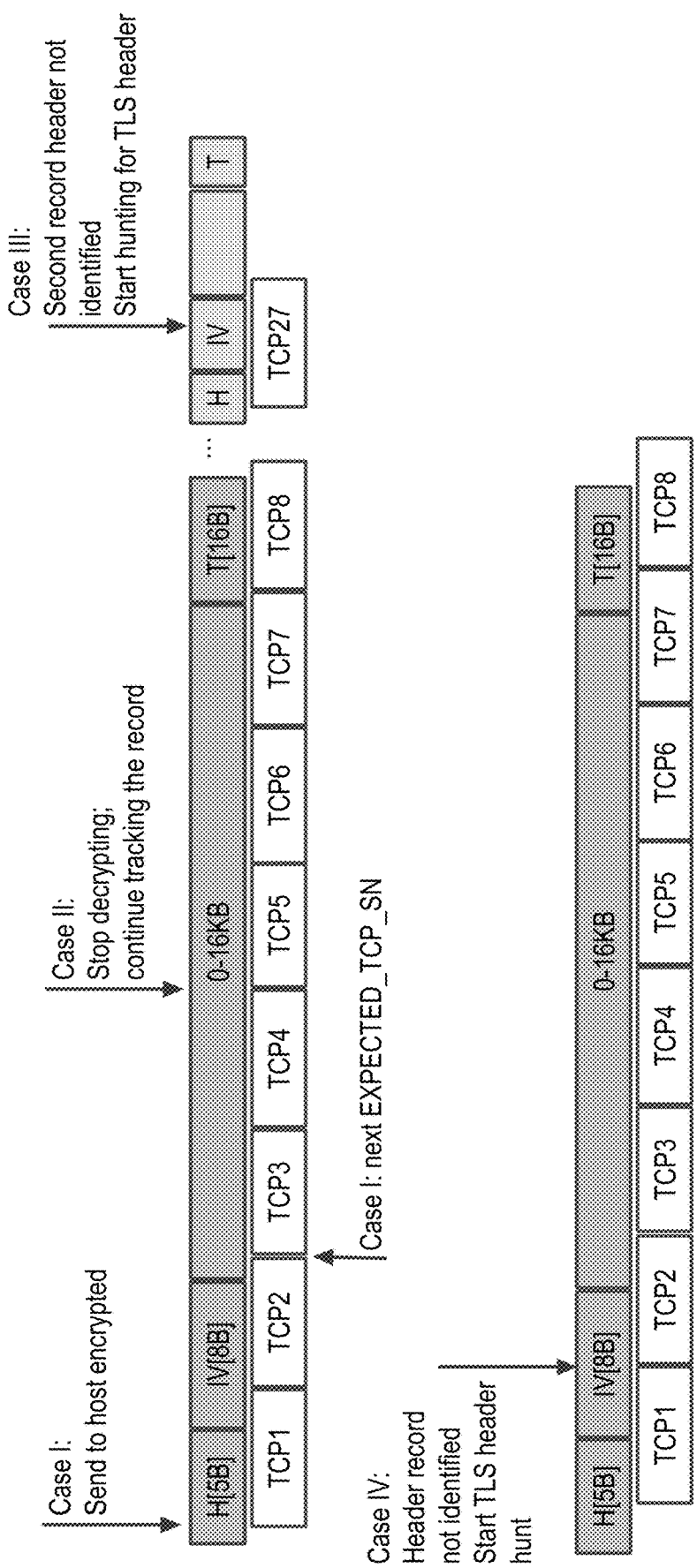
FIG. 4 depicts an example manner of processing record headers in various scenarios where packets are received out of order.

FIG. 4 depicts an example manner of processing record headers in various scenarios where packets are received out of order. For Case I, a valid TLS record header (e.g., 5 bytes) and initialization vector (IV) for a record are received in packets TCP1 and TCP2 at the receiver but received out of order (e.g., TCP2 then TCP1). A TLS header can include a type, TLS version (e.g., TLS1.2, TLS1.3, or other), and record length. An IV can be a seed that is used to decrypt the record. The record can be determined to be valid based on the decryption of the header and IV. In Case I, the header (e.g., decrypted header) and IV can be provided to an entity or agent (e.g., the host) to decrypt at a protocol stack or application. The NIC's decryption offload engine can track receipt of the record across multiple TCP packets received out of order because the record header and IV were detected. As TCP packet are received, the record with its tail (e.g., 16 bits) can be assembled for decryption by ordering the TCP packets from TCP1 to TCP8. For the next TLS record, the NIC's decryption offload engine can perform decryption.

For Case II, packets TCP1 to TCP 4 are received in order at the receiver NIC and the NIC's decryption offload engine can decrypt portions of the record. Based on the header, the record length can be determined by the decryption offload engine. The record can be determined to be valid based on the decryption of the header and IV. However, packet TCP5 is not received in order, and another packet such as TCP6 is received at the receiver NIC. The NIC's decryption offload engine can stop decrypting the record and send the header (e.g., decrypted header), IV, decrypted record portions, and received encrypted record segments to the host (e.g., protocol stack or application) to decrypt encrypted record segments. The offload engine can stop or temporarily pause performing record decryption.

In Cases III and IV, a TCP packet is received for a record segment for which a complete header was not previously identified by the NIC's decryption offload engine. Record size and IV (e.g., key seed) may not be available to decrypt the TLS record. In either Case III or IV, the offload engine can perform a search for M headers and provide the candidate M headers to the host to determine whether the M headers are valid. Based on the M headers being valid, the offload engine can continue to perform record decryption of data associated with a next identified header.

Figure 5:
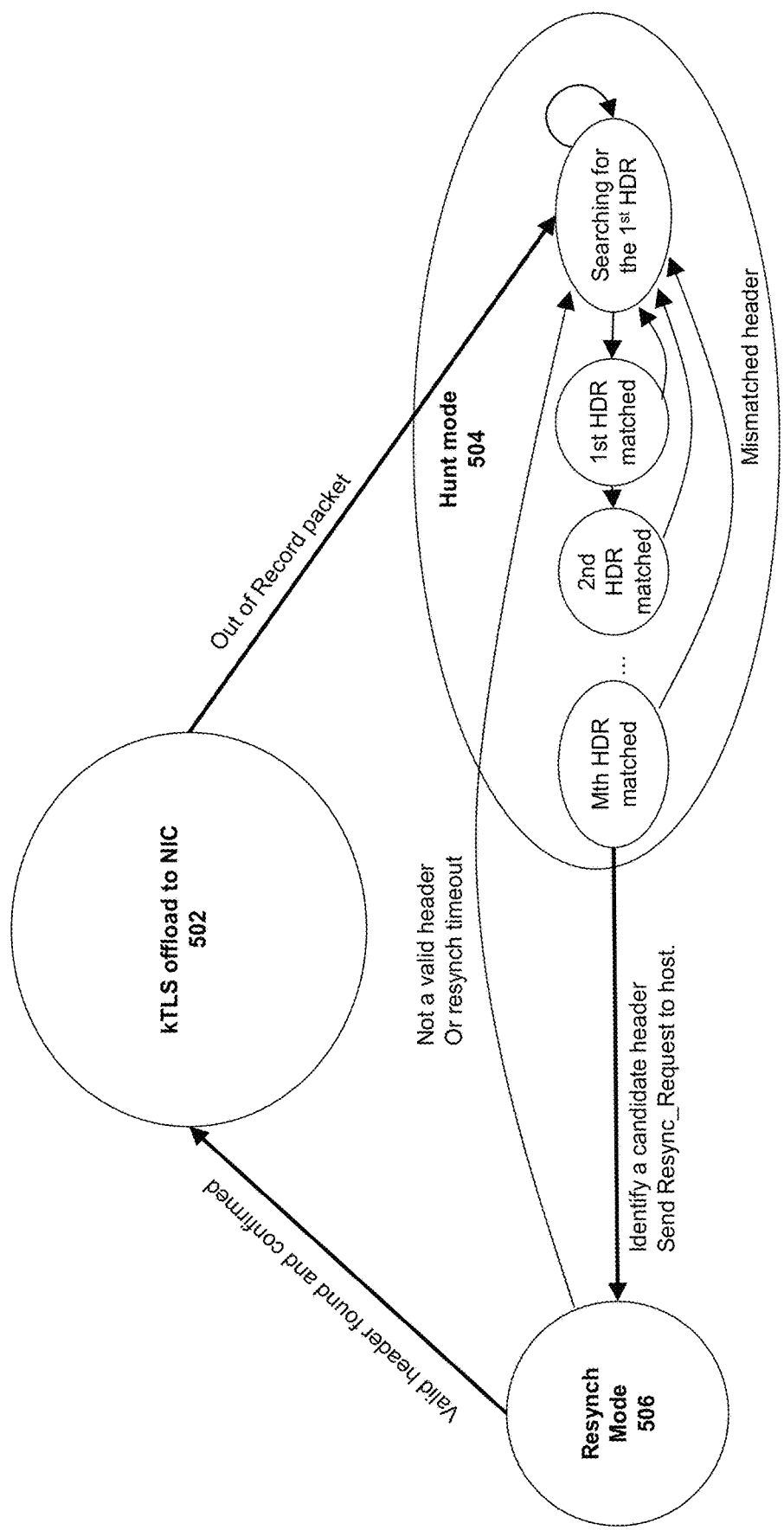
FIG. 5 depicts an example state diagram.

FIG. 5 depicts an example state diagram. The state diagram can represent modes of operation of an offload device at a NIC and a host system. In state 502, kTLS offload decryption can be performed in the NIC. For example, a kTLS offload engine, or other processors, in the NIC can perform the decryption of TLS records or other types of data. In some examples, a TLS offload engine includes operations of kTLS offload. For example, a system can remain in state 502 to decrypt a record received in one or more packets if a record header and IV for the record was identified and detected by the kTLS offload engine. If a record header and IV for a record are not identified and not detected by the kTLS offload engine of the NIC, hunt mode 504 can be entered.

In hunt mode 504, an integer M number of header (HDR) detections can be identified by the kTLS offload engine. In this example, M is at least 3 but M can be any integer, including 1 or more than 3. In hunt mode 504, kTLS offload engine can perform searches for one or more headers of different records. Searching for a header can include searching for a header character set by string matching a preamble (e.g., type (TY)), a header (e.g., a character string of 0303), and data length field (LE). For example, a header character set can include one or more characters including don't care or wild card. In some examples, a character string match and record length of between 0 and less than 16 KB can be used to identify a candidate header. If a string match and/or permitted record length is/are found, then the kTLS offload engine of the NIC can use record length information in the header to identify a start of a next record. For cases where two or more headers are to be identified, after a first header is identified, the kTLS offload engine of the NIC can search for a header of the next record by use of a length of the first record. The kTLS offload engine of the NIC can continue for M−1 number of headers. A string matching can be performed at a decryption engine to parse the payload word by word. String matching engine can consider the headers at the word boundary.

For one or more detected headers, the kTLS offload engine of the NIC can indicate to the host that a candidate header was received by providing one or more of: TCP packet sequence number for a TCP packet that includes the candidate header, offset from a start of the TCP packet to a start of the candidate header, candidate header type (TY), candidate header character string (e.g., 0303), and/or candidate header length (LE) value. For example, the kTLS offload engine of the NIC can provide the indication to a host (e.g., driver, OS, or application) and the host can enter resynch mode 506. The host can store a context in memory that tracks received TLS frames and track where a TLS frame starts (e.g., using a link list) in a TCP packet. Using stored context that tracks received TLS frames, the host can verify one or more candidate headers by determining if the candidate header is positioned as expected (or not) in a TCP packet with a particular sequence number and offset into the TCP packet. By comparing the sequence number and offset associated with the candidate header received from the kTLS offload engine with expected sequence number and offset, the host can determine if a candidate header is valid. In response to the host identifying M candidate headers as valid, then a resync_request can be sent to the driver with the TCP_SN of the last header location for confirmation.

Hunt mode 504 can correspond to Case III and Case IV whereby the NIC and host processor-executed software cooperatively synchronize at a future first_tcp_sn (e.g., sequence number of the first TCP packet in a TLS segment) and tls_rec_sn (e.g., the sequence number of the current TLS segment).

A last speculated header TCP sequence number (HDR_TCP_SN), header counter (HDR_CNTR), and a number of record headers passed after resync_request can be stored in a tuple in structure header_tuple. To increase a chance of finding the header, the offload engine can identify multiple candidate header_tuples, with at least one header seeded from a different initial string matching to the TLS version bytes. An example of this header_tuple structure is shown in the Table 1 below. In some examples, the header_tuple can replace part of the SA_Dynamic context or use storage resources otherwise available for use to store SA_Dynamic context.

TABLE 1

| HDR_CNTR_0 [8b] | HDR_TCP_SN_0 [4B] | TLS_Header[5B] | Flags [8b] |
|---|---|---|---|
| HDR_CNTR_1 | HDR_TCP_SN_1 | | MSB = 0: tls header search; MSB = 1: waiting for resync_response M = Number of matched headers |
| HDR_CNTR_2 | HDR_TCP_SN_2 | | |
| HDR_CNTR_3 | HDR_TCP_SN_3 | | |

The following Table 2 depicts an example of data stored during a hunt mode.

TABLE 2

| No. | SA_Dynamic | Fields During Hunt Mode and Resync Mode | TLS1.2 and 1.3 |
|---|---|---|---|
| Valid 1 HDR_TCP_SN_0 TLS_HDR | 2 HDR_TUPLE_0 32 40 | HDR_CNTR_0 | 8 |

TABLE 2-continued

| No. | SA_Dynamic | Fields During Hunt Mode and Resync Mode | TLS1.2 and 1.3 |
|---|---|---|---|
| FLAGS_0 | 8 | | |
| HDR_TUPLE_1 | 88 | | |
| HDR_TUPLE_2 (HDR_CNT, HDR_TCP_SN) | 40 | | |
| Reserved | 29 | | |
| ECC | 9 | | |
| Reserved | 24 | | |
| HDR_TUPLE_2(TLS_HDR, FLAGS) | 48 | | |
| HDR_TUPLE_3 | 88 | | |
| LAST_4Bytes | 32 | Stores the last 4 bytes of a payload for string matching | |
| 34 | Flags | | 16 |
| Reserved | 32 | | |
| 35 | Reserved | | 7 |
| ECC | 9 | | |
| 36 | Total | | 512 |

In response to the host receiving a resync_request from the kTLS offload engine, the host can wait until the TCP_SN of the header in a resync_request is provided by the offload engine to the host. The host can generate a positive or negative response to the offload engine with the same resync_request_id, and including the tls_rec_sn of the TCP_SN of the record header. After the offload engine receives the resync_response from the driver, it looks up the header tuple entry for the given resync_request_id and adds the tls_rec_sn to the HDR_CNTR to generate the correct tls_rec_sn for the header TCP_SN in the header_tuple.

Register or memory space can be allocated to store security association (SA) dynamic field bits, such as, but not limited to partial encryption data (PED). In some examples, during hunt mode 504, at least some of the SA dynamic field bits are not valid and storage resources for such bits could be used by the kTLS offload engine to store the candidate TLS header information. During hunt mode 504, information of multiple candidate headers (e.g., at least TCP packet sequence number and offset from a start of a TCP packet at which a candidate header begins) can be stored in SA dynamic field bits.

A number of tuple headers tracked can depend on how many bits are needed to track a header, and how much space is available in the SA table. A header tuple can be 88b, and storing 4 header tuples adds 332b in the SA_Context and replaces a lower half of the SA_Context, leaving the error correction coding (ECC), Flags, and debugging counters in the SA_Context intact. One or more of the 8-header tracking sequence can be based on a different version bytes match. The first header tracking sequence that have M matched header will send the resync_request to the host. In some examples, subsequent resync_request are not made after a first resync_request is sent to the host, until a negative resync_response is received from the host. In the meantime, other header_tuples can be used to continue tracking potential header locations.

In resynch mode 506, the host can determine if the received M candidate header(s) from the kTLS offload engine of the NIC correspond(s) to a valid record header. For example, the host driver, protocol layer stack (e.g., OS), and/or application can decrypt the record header and determine if the header is a valid header. In some examples, if version bytes of the M candidate headers match an expected value, the M candidate headers can be determined to be valid. In some examples, if a version byte of one or more of the M candidate headers do not match an expected value, the M candidate headers can be determined to be invalid. The host can confirm that that TCP_SN includes a valid TLS header TCP_SN and can send the corresponding tls_rec_sn of that header. The host can indicate that the header is valid and cause the NIC to enter state 502 whereby the kTLS offload engine of the NIC can perform decryption of records starting at a header of a next record. However, if one or more of the M candidate headers are invalid, hunt mode 504 is entered again with a counter reset to 0 and has to reach to M again. In some examples, if the host does not send a response to the header candidates in a prescribed amount of time, the offload engine can enter TIMEOUT and perform searches for M candidate headers.

During resynch mode 506, hunt mode 504 can continue whereby a kTLS offload engine can track headers, in case a new header is received. The offload engine can maintain a count of a number of additional headers that have arrived after the resync_request is sent to the host.

In response to receipt of a confirmation of a valid header from the host, the correct TLS_REC_SN can be constructed for the current TLS record by adding the tls_rec_sn that came from the host and the number of headers that offload engine had counted since. The offload engine can store the first_TCP_SN, and an amount of zero bit padding can be reset to 0, and decryption by the offload engine can be restarted from the first packet containing the next TLS header.

Figure 6A:
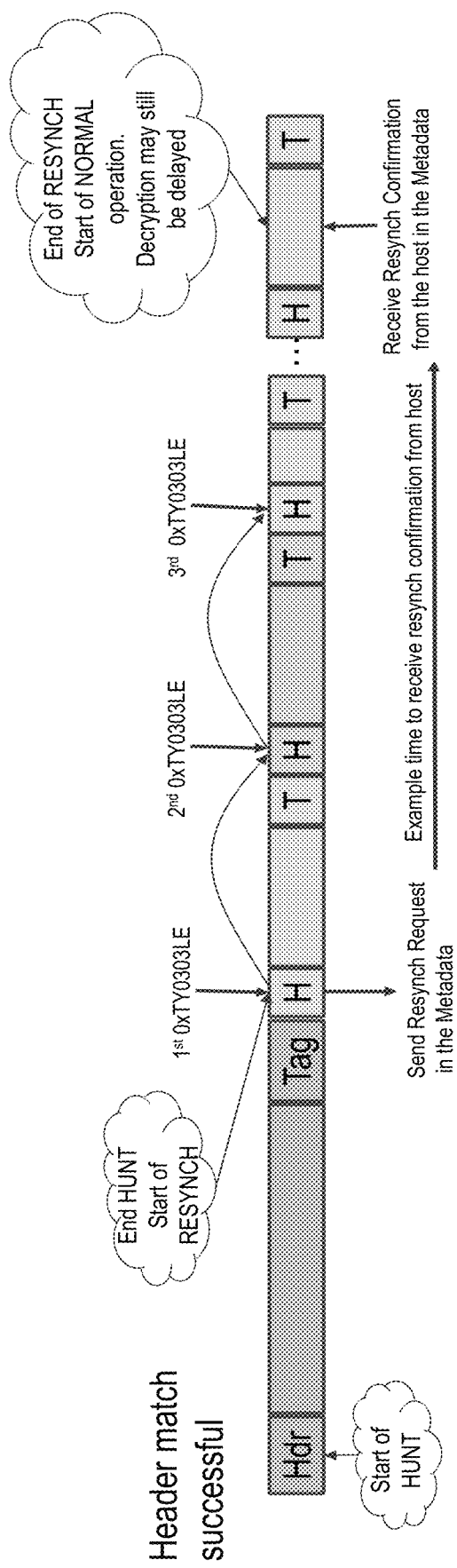
FIG. 6A depicts an example of header hunting.

FIG. 6A depicts an example of header hunting. In this example, a header hunt commences to identify a type (TY), 0303 character string followed by valid length (LE). After a receipt of a resynch indication from a host, the NIC can perform decryption starting with start of a next detected record.

Figure 6B:
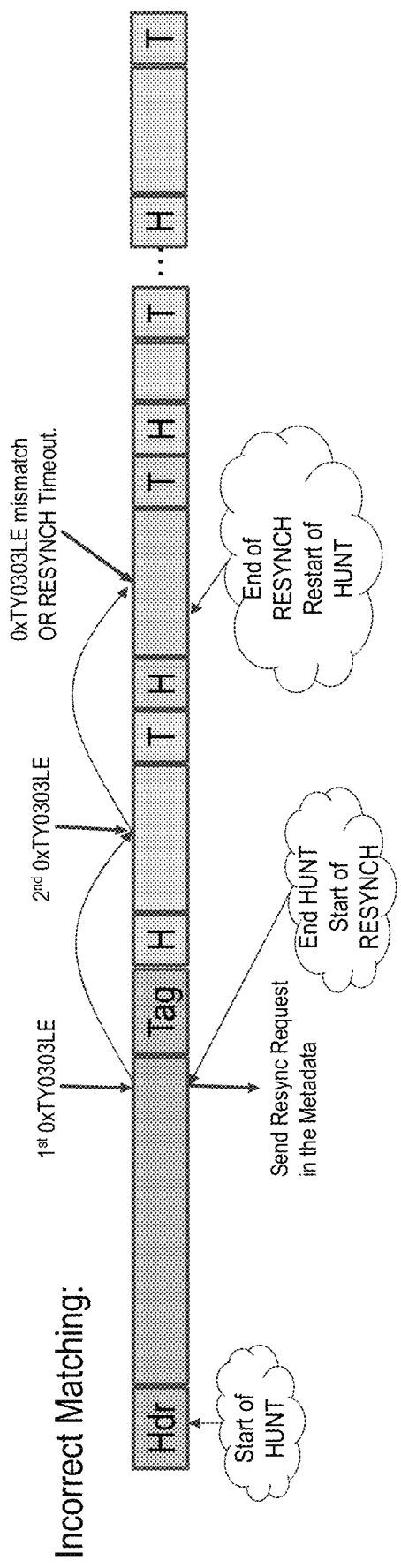
FIG. 6B depicts an example of an identification of candidate start of record header.

FIG. 6B depicts an example of an identification of candidate start of record header. In this example, the host indicates the candidate header is not a valid header. The NIC can start its hunt for a candidate header in a record examined when the indication from the host indicates the M candidate headers includes an invalid header.

Figure 7:
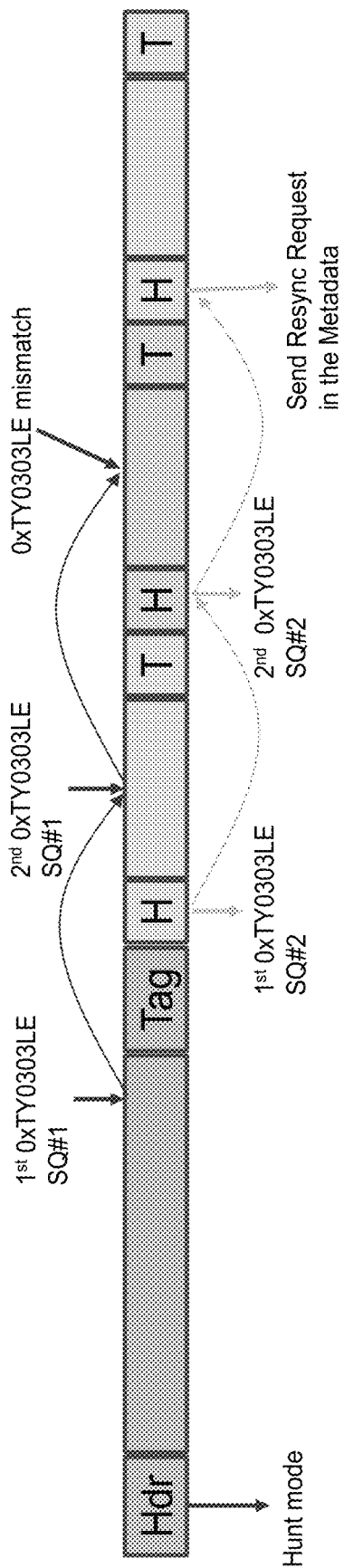
FIG. 7 depicts an example of a header match followed by sequential analysis of the received record to identify another header match.

FIG. 7 depicts an example of a header match followed by sequential analysis of the received record to identify another header match. For at least two candidate header matches, an identified record length can be used to determine if another candidate header is present at or after the identified record length and at a beginning of a next record. One or more header candidates can be identified and distinguished using a sequence number. In this example, sequence numbers SQ #1 and SQ #2 are used to track to two searches candidate headers. M candidate headers can be attempted to be identified for sequence numbers SQ #1 and SQ #2.

Figure 8:
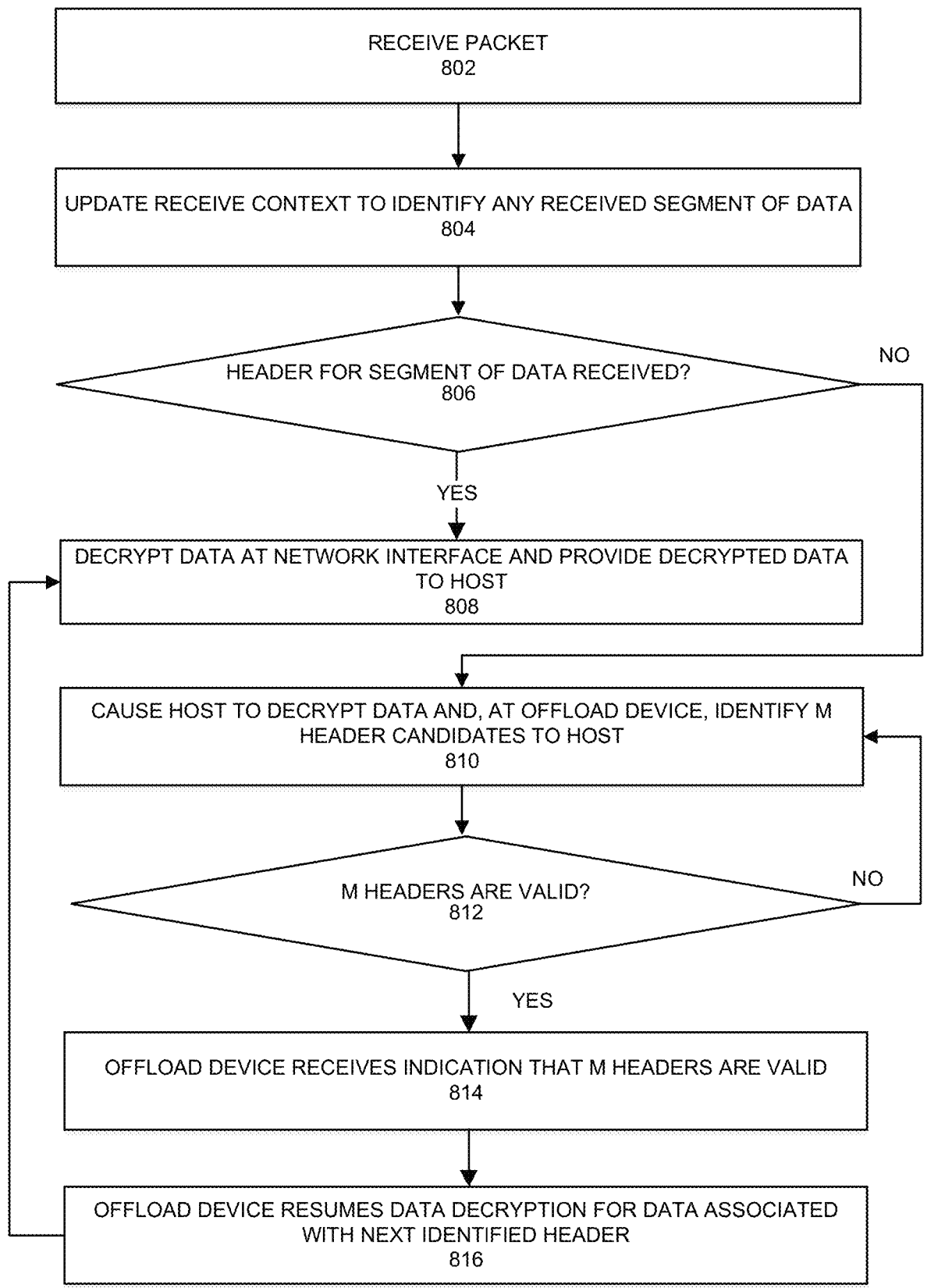
FIG. 8 depicts an example process that can be performed by a receiver system.

FIG. 8 depicts an example process that can be performed by a receiver system. For example, the process can be performed using a network interface and decryption offload device such as a kTLS or TLS offload engine. At 802, a packet is received at a network interface. The network interface can include the capability to manage re-assembly of data segments (e.g., portions of TLS records) and perform decryption of data segments. The network interface can include one or more of: a NIC, IPU, or DPU. At 804, an update of a receive context can occur to identify one or more received packets. For example, packets can carry encrypted data such as encrypted TLS records and their associated preamble and header. The preamble and/or header may be unencrypted in some examples. Various techniques can be used by a network interface to track receipt of segments of data such as a linked-list that tracks one or more received data and one or more segment received for the data based on receipt of header of the data and length of data expected to be received.

At 806, a determination can be made if the received packet includes a data segment for which a header was not previously identified. For example, a received packet that includes a segment number that is not a next expected sequential number relative to other previously received packets can be considered an out of order received packet and if a data segment in such out of order packet does not correspond to being within a data (e.g., TLS record) for which a header was received and data length was identified, the data segment can be considered as not having a previously received or identified header. If the received packet includes a data segment for which a header was not previously identified, the process can continue to 810. If the received packet includes a data segment for which a header was previously identified, the process can continue to 808.

At 808, the network interface can decrypt the data. For example, a kTLS or TLS decryption offload device of the network interface can decrypt data such as TLS records based on applicable decryption standards. Decrypted data can be copied to a host system for access from memory by an application. Decryption of data can occur on 128 bit data segments received in packets. Padding of zero values before or after a data segment can be employed if less than a full 128 bit data segment is available to decrypt. Information from decrypted data segments can be carried forward for use to decrypt one or more subsequent data segments in accordance with relevant decryption specifications.

At 810, the network interface can cause the host system to decrypt data and the network interface can perform a search for data headers candidates. In some examples, a host can perform data decryption for one or more data segments for which a header was not previously identified and also perform data decryption until the offload device is permitted to resume data decryption. In some examples, the offload device can search for M consecutive matched header candidates. In some examples, the M header candidates can refer to sequential header candidates identified using M data length fields. In some examples, M is greater than or equal to 2 to increase a likelihood that the offload device has correctly identified multiple identified headers. In some examples, the data header is unencrypted and the offload device can identify a data header by a character sequence that identifies a header, such as a character sequence of 0303 although other sequences can identify data headers. The number M of header candidates that the offload device is to identify can be configured by an administrator using a device driver.

In some examples, the offload device can determine if a header candidate is present after a previously identified data length. If a header candidate is present after a previously identified data length, the offload device can include such header candidate among the M header candidates. In some examples, even after a header candidate and data length are found, in addition to searching for another header candidate at or after the previously identified data length, searching can continue for other candidate headers and associated data length within a data of the previously identified data length. Accordingly, N number of searches can be conducted in parallel on the data for the header of the data segment with a header that was not previously identified. N can represent a number of parallel header streams that are tracked. In some examples, N may be 1 or more.

To search for a header candidate, a length value associated with a header can be used to identify a next data header. If the next data header corresponds to character sequence that identifies a header, then such next data header can correspond to a second header candidate. The second header candidate can identify a length of the data associated with the second header candidate and an offset to a position of a beginning of another data. The offload device can determine if a third header candidate is positioned after a data length associated with the second header candidate. After M number of identifications of header candidates positioned identified at positions determined by the data length of a prior candidate header, the process can proceed to 812. Note that in some examples, if M headers are not found in a certain time period, an indication can be made to the host to indicate loss of synchronization and the host can cause the offload engine to cease or pause header candidate searching.

According to some embodiments, some computing resources of the offload device can be used to perform searching for headers instead of being idle or using the host CPU to perform header detection. This can lower CPU utilization or allow the CPU to be used for other activities that header detection such as to increase a speed of data decryption.

At 812, the host can determine whether the M header candidates correspond to valid headers. For example, an application, operating system, or driver can determine if the M header candidates correspond to headers based on having valid version identifiers or having expected values in other fields. If the M header candidates correspond to valid headers, the process can proceed to 814. If one or more of the M header candidates do not correspond to a valid header, the process can return to 810.

At 814, the host can indicate to the offload device that the M header candidates correspond to valid data headers. At 816, the offload device can resume decryption of data associated with a next received data header. The next received data header can be a data header identified by the offload device after the offload device receives an indication that the M header candidates correspond to data headers.

Figure 9:
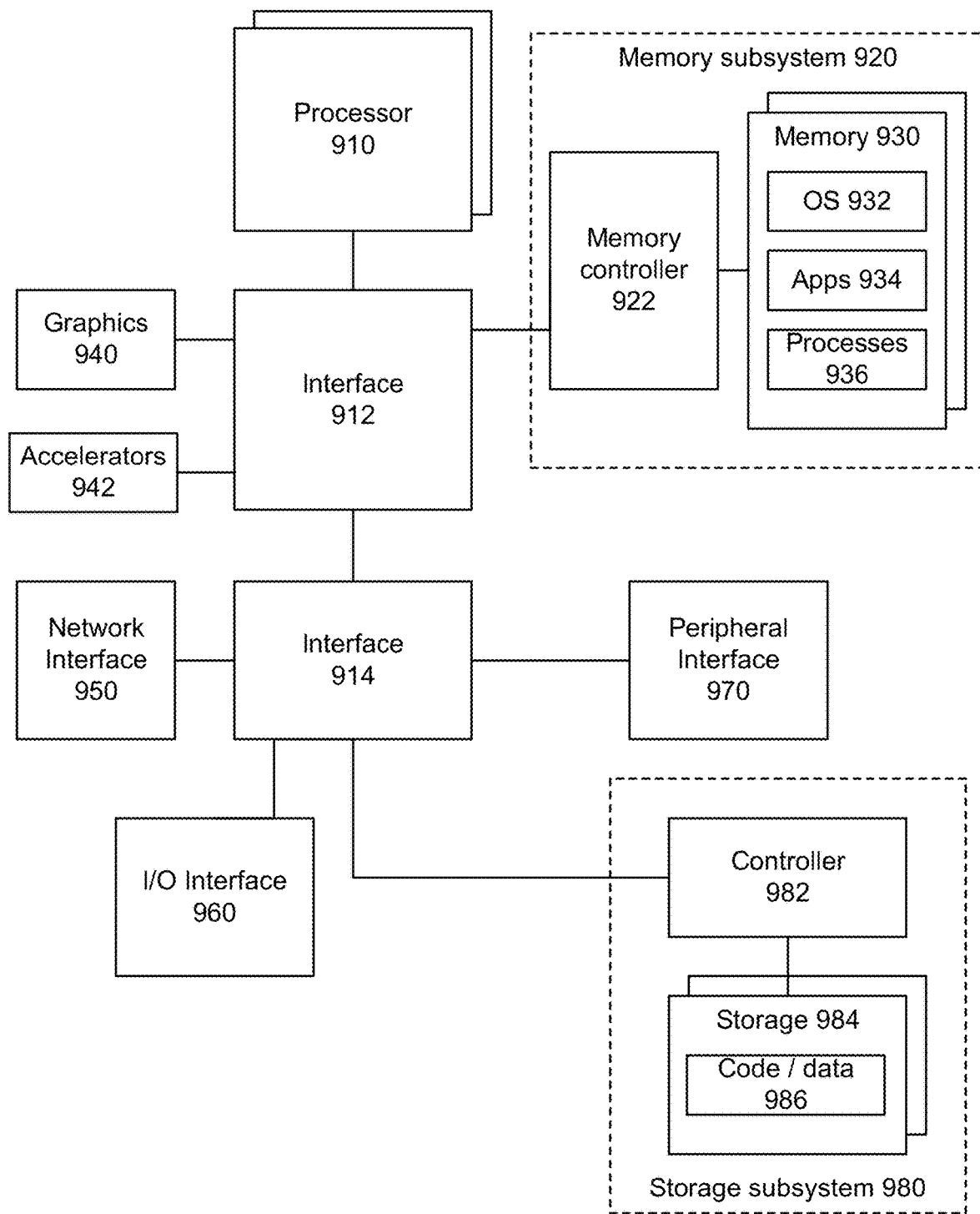
FIG. 9 depicts an example system.

FIG. 9 depicts a system. The system can use embodiments described herein to offload data decryption and header searching to an offload engine of a network interface. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices. An xPU or XPU can refer at least to one or more of: a CPU, IPU, DPU, GPU, GPGPU, and/or other processing units (e.g., accelerator).

Various examples of a processor, XPU, or IPU can perform an application composed of microservices, where a microservice runs in its own process and communicates using protocols (e.g., application program interface (API), message service, or remote procedure calls (RPC)). Microservices can be independently deployed using centralized management of these services. The management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or container or virtual machine deployment, and decentralized continuous microservice delivery.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be programmable or fixed function offload engines that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU or connected to CPU by various devices (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 can receive data from a remote device, which can include storing received data into memory.

Some examples of network device 950 are part of an Infrastructure Processing Unit (IPU) or data processing unit (DPU) or utilized by an IPU or DPU. An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization, and so forth), and manage operations performed on other IPUs, DPUs, servers, or devices.

Some examples of network device 950 can perform TLS offload and header searching in accordance with embodiments described herein.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or one or more of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

In an example, system 900 can be implemented using interconnected compute systems of processors, memories, storages, network interfaces, and other components. High speed interconnects can be used to communicatively couple devices, where high speed interconnects can be consistent with one or more of: Ethernet (IEEE 802.3), remote direct memory access (RDMA), InfiniB and, Internet Wide Area RDMA Protocol (iWARP), User Datagram Protocol (UDP), quick User Datagram Protocol (UDP) Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Figure 10:
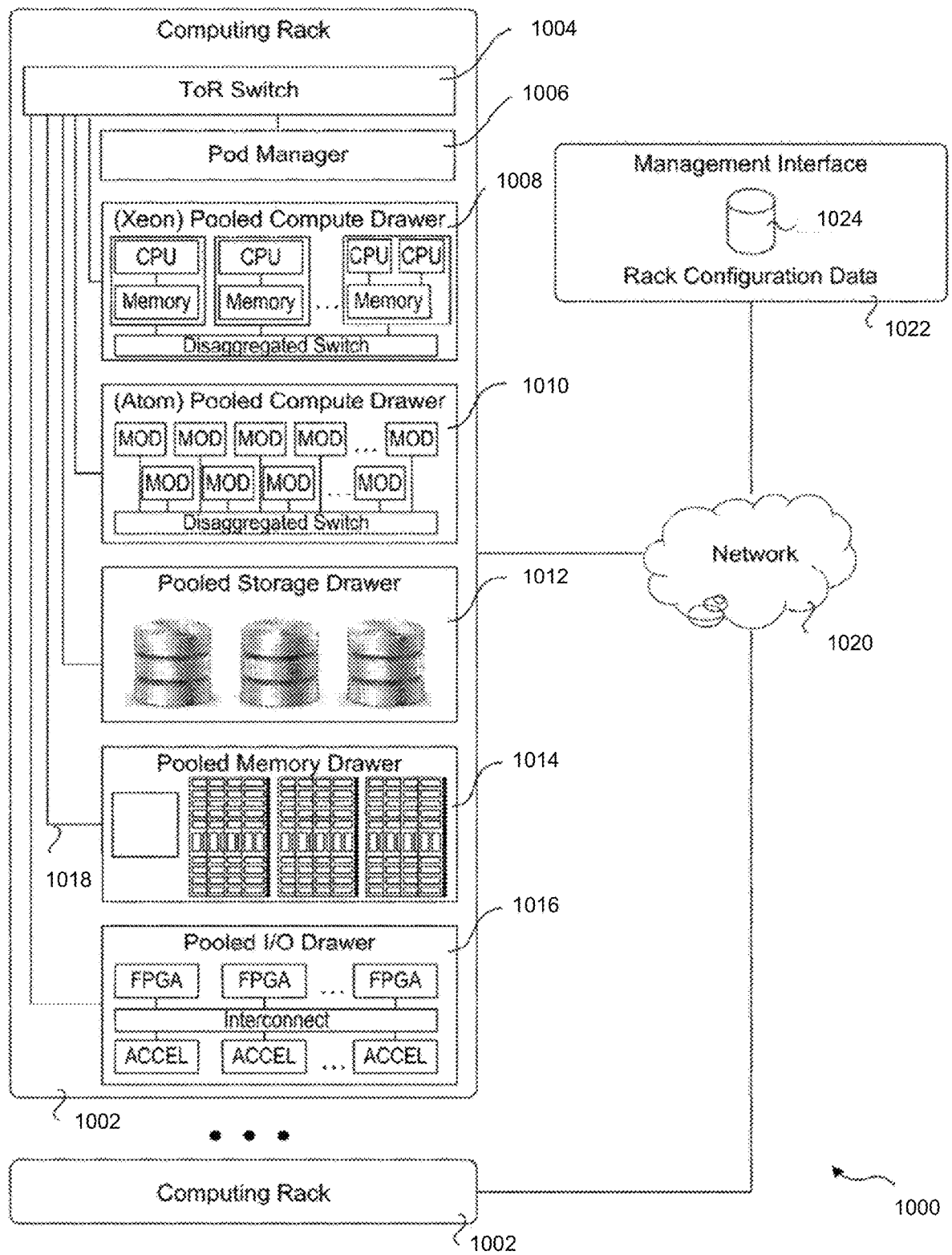
FIG. 10 depicts an example environment.

FIG. 10 depicts an environment 1000 includes multiple computing racks 1002, some including a Top of Rack (ToR) switch 1004, a pod manager 1006, and a plurality of pooled system drawers. Various embodiments can be used to decrypt data in a network interface and perform header searching in a network interface. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1008, and Intel® ATOM™ pooled compute drawer 1010, a pooled storage drawer 1012, a pooled memory drawer 1014, and a pooled I/O drawer 1016. Some of the pooled system drawers is connected to ToR switch 1004 via a high-speed link 1018, such as an Ethernet link or a Silicon Photonics (SiPh) optical link.

Multiple of the computing racks 1002 may be interconnected via their ToR switches 1004 (e.g., to a pod-level switch or data center switch), as illustrated by connections to a network 1020. In some embodiments, groups of computing racks 1002 are managed as separate pods via pod manager(s) 1006. In one embodiment, a single pod manager is used to manage racks in the pod. Alternatively, distributed pod managers may be used for pod management operations.

Environment 1000 further includes a management interface 1022 that is used to manage various aspects of the environment. This includes managing rack configuration, with corresponding parameters stored as rack configuration data 1024.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for one another. For example, descriptions using the terms "connected" and/or "coupled" may indicate that two or more elements are in direct physical or electrical contact with one another. The term "coupled," however, may also mean that two or more elements are not in direct contact with one another, but yet still co-operate or interact with one another.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes an apparatus that includes: a Transport Layer Security (TLS) offload engine to: based on detection of encrypted data unassociated with a previously detected data header: search for one or more data headers; identify at least two candidate data headers for validation; and based on receipt of an indication that the at least two candidate data headers are valid, perform decryption of received data in one or more packets.

Example 2 includes one or more other examples, wherein the TLS offload engine is to: based on receipt of an indication that one or more of the at least two candidate data headers is not a valid header, search for two or more other candidate data headers.

Example 3 includes one or more other examples, wherein to search for one or more data headers, the TLS offload engine is to: identify a header character set associated with a first candidate data header; determine a data length associated with the first candidate data header; and identify the header character set associated with a second candidate data header at a location based on the data length.

Example 4 includes one or more other examples, wherein to identify at least two candidate data headers for validation, the TLS offload engine is to: provide the first and second candidate data headers to another agent or entity for validation.

Example 5 includes one or more other examples, wherein the TLS offload engine is to: search for another candidate data header after the first candidate data header and before the second candidate data header.

Example 6 includes one or more other examples, wherein at least one candidate data header comprises one or more of: a preamble, header, and length field.

Example 7 includes one or more other examples, wherein to search for one or more data headers, the TLS offload engine is to utilize resources otherwise used for decryption to search for one or more data headers.

Example 8 includes one or more other examples, and includes a network interface that includes the TLS offload engine, wherein the network interface comprises one or more of: an Infrastructure Processing Unit (IPU), data processing unit (DPU), network interface controller (NIC), or smartNIC.

Example 9 includes one or more other examples, and includes a server, wherein the server is to determine if the at least two candidate data headers are valid and indicate whether the at least two candidate data headers are valid or includes one or more invalid candidate data headers.

Example 10 includes one or more other examples, and includes a method comprising: at a Transport Layer Security (TLS) offload engine, based on detection of encrypted data unassociated with a previously detected header: searching for one or more headers; identifying at least two candidate headers; and based on receipt of an indication that the at least two candidate headers are valid headers, performing decryption of received data in one or more packets.

Example 11 includes one or more other examples, and includes: at the TLS offload engine: based on receipt of an indication that one or more of the at least two candidate headers is not a valid header, searching for two or more other candidate headers.

Example 12 includes one or more other examples, wherein searching for one or more headers comprises: identifying a header character set associated with a first candidate header; determining a data length associated with the first candidate header; and identifying the header character set associated with a second candidate header at a location based on the data length.

Example 13 includes one or more other examples, wherein identifying at least two candidate headers for validation comprises: providing the first and second candidate headers to a server for validation.

Example 14 includes one or more other examples, and includes: searching for another candidate header after the first candidate header and before the second candidate header.

Example 15 includes one or more other examples, wherein at least one candidate header comprises one or more of: a preamble, header, and length field.

Example 16 includes one or more other examples, and at least one computer-readable medium, comprising instructions stored thereon, that if executed by at least one processor, cause the at least one processor to: execute a device driver to configure a network interface controller to search for two or more candidate headers based on identification of a data for which its header was not previously identified.

Example 17 includes one or more other examples, wherein to search for two or more candidate headers, the network interface controller is to: identify a header character set associated with a first candidate header; determine a data length associated with the first candidate header; and identify the header character set associated with a second candidate header.

Example 18 includes one or more other examples, wherein the network interface controller is to: provide the first and second candidate headers to a host system for validation.

Example 19 includes one or more other examples, wherein to search for one or more candidate headers, the network interface is to: search for another candidate header after the first candidate header and before the second candidate header.

Example 20 includes one or more other examples, wherein at least one candidate header comprises one or more of: a preamble, header, and length field.

What is claimed is:

1. An apparatus comprising:
   an interface and
   a Transport Layer Security (TLS) offload engine circuitry coupled to the interface, the TLS offload engine circuitry to:
      based on detection of packets received out-of-order:
      search for at least two candidate data headers;
      based on the at least two candidate data headers being valid, perform decryption of received data in two or more packets associated with the at least two candidate data headers; and
      based on at least one of the at least two candidate data headers is not valid, do not perform decryption of the received data in the two or more packets, wherein to search for at least two candidate data headers, the TLS offload engine circuitry is to:
      determine a data length associated with a first candidate data header and
      identify a second candidate data header at a location based on the data length.

2. The apparatus of claim 1, wherein the TLS offload engine circuitry is to:
   based on the at least one of the at least two candidate data headers is not a valid, search for at least one other candidate data header.

3. The apparatus of claim 1, wherein to search for at least two candidate data headers, the TLS offload engine circuitry is to:
   provide the first and second candidate data headers to another agent or entity for validation.

4. The apparatus of claim 1, wherein the TLS offload engine circuitry is to:
   search for another candidate data header after the first candidate data header and before the second candidate data header.

5. The apparatus of claim 1, wherein at least one candidate data header of the at least two candidate data headers comprises one or more of: a preamble, header, and length field.

6. The apparatus of claim 1, wherein to search for the at least two candidate data headers, the TLS offload engine circuitry is to utilize resources otherwise used for decryption to search for one or more data headers.

7. The apparatus of claim 1, comprising a network interface that includes the TLS offload engine circuitry, wherein the network interface comprises one or more of: an Infrastructure Processing Unit (IPU), data processing unit (DPU), network interface controller (NIC), or smartNIC.

8. The apparatus of claim 1, comprising a server, wherein the server is to determine if the at least two candidate data headers are valid and indicate whether the at least two candidate data headers are valid or includes one or more invalid candidate data headers.

9. A method comprising:
   a Transport Layer Security (TLS) offload engine performing:
      based on detection of packets received out-of-order:
      searching for at least two candidate headers;
      based on the at least two candidate headers are valid headers, performing decryption of received data in two or more packets associated with the at least two candidate headers; and
      based on at least one of the at least two candidate headers is not valid, do not perform decryption of the received data in the two or more packets, wherein searching for at least two candidate headers comprises:
      determining a data length associated with a first candidate header and
      identifying a second candidate header at a location based on the data length.

10. The method of claim 9, comprising:
    the TLS offload engine performing:
       based on one or more of the at least two candidate headers is not a valid header, searching for at least one other candidate header.

11. The method of claim 9, wherein searching for at least two candidate headers comprises:
    providing the first and second candidate headers to a server for validation.

12. The method of claim 9, comprising:
    searching for another candidate header after the first candidate header and before the second candidate header.

13. The method of claim 9, wherein at least one candidate header of the at least two candidate headers comprises one or more of: a preamble, header, and length field.

14. At least one non-transitory computer-readable medium, comprising instructions stored thereon, that if executed by at least one processor, cause the at least one processor to:
    execute a device driver to configure a network interface controller to:
       based on receipt of packets out-of-order:
       search for two or more candidate headers, wherein the search for two or more candidate data headers, the network interface controller is to:
       determine a data length associated with a first candidate data header and
       identify a second candidate data header at a location based on the data length;

based on the two or more candidate headers being valid, perform decryption of received data in two or more packets associated with the at least two or more candidate headers; and based on at least one of the two or more candidate headers is not valid, do not perform decryption of the received data in the two or more packets.

15. The at least one computer-readable medium of claim 14, wherein the network interface controller is to:

provide the first and second candidate headers to a host system for validation.

16. The at least one computer-readable medium of claim 14, wherein to search for one or more candidate headers, the network interface is to:

search for another candidate header after the first candidate header and before the second candidate header.

17. The at least one computer-readable medium of claim 15, wherein at least one candidate header of the at least two candidate headers comprises one or more of: a preamble, header, and length field.

* * * * *